US008363084B2

(12) United States Patent
Cockerton et al.

(10) Patent No.: US 8,363,084 B2
(45) Date of Patent: Jan. 29, 2013

(54) METHOD AND SYSTEM FOR CORRELATING CONTENT WITH LINEAR MEDIA

(75) Inventors: Craig George Cockerton, Hamilton (NZ); Peter Philip Moodie, Oslo (NO); Patrick Mathias Kunz, St. Gallen (CH)

(73) Assignee: Cisco Systems New Zealand Limited, Auckland (NZ)

( * ) Notice: Subject to any disclaimer, the term of this patent is extended or adjusted under 35 U.S.C. 154(b) by 1485 days.

(21) Appl. No.: 11/632,480

(22) PCT Filed: Jun. 30, 2005

(86) PCT No.: PCT/NZ2005/000150
§ 371 (c)(1),
(2), (4) Date: Jul. 23, 2007

(87) PCT Pub. No.: WO2006/006875
PCT Pub. Date: Jan. 19, 2006

(65) Prior Publication Data
US 2007/0273754 A1    Nov. 29, 2007

(30) Foreign Application Priority Data
Jul. 14, 2004   (NZ) .................................... 534100

(51) Int. Cl.
*H04N 7/14*   (2006.01)
(52) U.S. Cl. .................................... 348/14.01; 715/203
(58) Field of Classification Search ............... 348/14.01, 348/14.08, 14.09; 715/203, 204, 205
See application file for complete search history.

(56) References Cited

U.S. PATENT DOCUMENTS

| 5,600,775 | A  | * | 2/1997  | King et al. ..................... 715/203 |
| 6,006,241 | A  | * | 12/1999 | Purnaveja et al. ............ 715/205 |
| 6,449,653 | B2 | * | 9/2002  | Klemets et al. ................ 709/231 |
| 7,412,643 | B1 | * | 8/2008  | Fischer et al. ................. 715/200 |
| 2001/0023436 | A1 | * | 9/2001 | Srinivasan et al. ............ 709/219 |
| 2002/0069218 | A1 |   | 6/2002  | Sull et al. |
| 2003/0074671 | A1 |   | 4/2003  | Murakami et al. |

(Continued)

FOREIGN PATENT DOCUMENTS

| JP | 2003-99453 | 4/2003 |
| JP | 2004-7539  | 1/2004 |

(Continued)

OTHER PUBLICATIONS

Ronald Schroeter, et al., " Filmed-Collaborative Video Indexing, Annotation and Discussion Tools Over Broadlband Networks", Proceedings of the 10th International Multimedia Modelling Conference, pp. 346-353, 2004.

(Continued)

*Primary Examiner* — Stella Woo
(74) *Attorney, Agent, or Firm* — Oblon, Spivak, McClelland, Maier & Neustadt, L.L.P.

(57) ABSTRACT

A method and system for correlating content with linear media. More particularly, but not exclusively, the method and system correlate synchronous content with linear media by linking the content to a portion of the linear media, and including creating content related to the linear media; identifying a portion of the linear media corrected to the content; and linking the content to the portion; wherein the content is not synchronized with the linear media and the content is created non-contemporaneously with creation of the linear media.

27 Claims, 4 Drawing Sheets

U.S. PATENT DOCUMENTS

| | | |
|---|---|---|
| 2003/0177503 A1 | 9/2003 | Sull et al. |
| 2004/0080611 A1 | 4/2004 | Kakii et al. |
| 2004/0098754 A1 | 5/2004 | Vella et al. |
| 2007/0033170 A1 | 2/2007 | Sull et al. |
| 2007/0033292 A1 | 2/2007 | Sull et al. |
| 2007/0033515 A1 | 2/2007 | Sull et al. |
| 2007/0033521 A1 | 2/2007 | Sull et al. |
| 2007/0033533 A1 | 2/2007 | Sull |
| 2007/0038612 A1 | 2/2007 | Sull et al. |
| 2007/0044010 A1 | 2/2007 | Sull et al. |

FOREIGN PATENT DOCUMENTS

| | | |
|---|---|---|
| WO | 03 019418 | 3/2003 |
| WO | 03 027893 | 4/2003 |

OTHER PUBLICATIONS

David Bargeron, et al., "Annotations for Streaming Video on the Web: System Design and Usage Studies", Computer Networks, vol. 31 (11-16), pp. 1139-1153, 1999.

Matthias Finke, et al., "Design Principles for a Collaborative Hypervideo User Interface Concept in Mobile Environments", Proceedings of the 10$^{th}$ International Conference on Human-Computer Interaction, pp. 53-57, 2003.

Dirk Balfanz, et al., "An Interactive Video System Supporting E-Commere Product Placement", Proceedings World Scientific and Engineering Society Conferences, 2001.

Dr. Silvia Pfeiffer, et al., " The Continuous Media Web", Multimedia Workshop, Jun. 18, 2004.

Dr. Silvia Pfeiffer, et al., "Annodex: A Simple Architecture to Enable Hyperlinking, Search & Retrieval of Time-Continuous Data on the Web", Proceedings of the 5$^{th}$ ACM Sigmm International Workshop on Multimedia Information Retrieval, pp. 87-93, 2003.

Intranel 'Miranda' Digital Video Coder Suit, Stage 1 Preliminary Specifications Document, Oct. 17, 2003.

Triangle Research Collaborative OCS Event Recorder Descriptive Document, Nov. 24, 2002, http://web.archive,org/web/2002112416137/http://www.trctech.com.

Office Acton issued Apr. 26, 2010 in Japanese Patent Application No. 2007-521427 (with English translation).

Supplementary Search Report issued Mar. 9, 2011 in European Patent Application No. EP 05 75 7590.

Hirohide Haga, "Combining Video and Bulletin Board System in distance Education Systems", The Internet and Higher Education, XP004366559, vol. 5, No. 2, Jul. 1, 2002, pp. 119-129.

Nevenka Dimitrova, et al., "Applications of Video-Content Analysis and Retrieval", IEEE MultiMedia, XP011094628, vol. 9, No. 3, Jul. 1, 2002, pp. 42-55.

\* cited by examiner

METHOD AND SYSTEM FOR CORRELATING CONTENT WITH LINEAR MEDIA

FIELD OF INVENTION

The present invention relates to a method and system for correlating content with linear media. More particularly, but not exclusively, the present invention relates to a method and system for correlating asynchronous content with linear media by linking the content to a portion of the linear media.

BACKGROUND OF THE INVENTION

Collaboration in videoconferencing is currently based around synchronous methods. When the videoconference is taking place attendees make use of such aspects as live chat, shared whiteboard and document sharing. These features are useful while the conference is taking place but lose value when the conference is finished as they require people to be available at the same time.

Combining the recorded videoconference with asynchronous collaboration methods allows both videoconference attendees and others who could not take part in the videoconference to revisit it in their own time and review the video (or audio) and take part in discussions about that content asynchronously. However simply providing a link to the video and then a link to the discussions is very limited and offers very little added value. The concept of linking asynchronous collaboration with synchronous media (linear media) provides a deep level of integration between the two by bringing them together and presenting them as a single technology rather than a combination of the two.

Current methods for linking linear media and asynchronous technologies (e.g. asynchronous collaboration) are limited in the scope and effectiveness of their linking.

In an asynchronous collaborative environment such as an online discussion forum a user is permitted to post a message containing a link (e.g. URL) to some form of linear media such as a streaming video. This is a one way link and only serves the purpose of directing the reader to the streamed media so that they may view it. Discussion can take place around this streamed video but only in such a manner that the message postings refer to the streamed video by reference through their text. Reference to a specific point within the streamed video must be explained in the message posting text (e.g. "in the following video (link provided) at around 16 minutes") and then the viewer is required to seek to that point searching for the exact location. The video may only be viewed by clicking on the link within the message to launch it, the message itself holds no further reference to the streamed video.

An advancement on the standard URL link is the "bookmark". In this case the user can not only create a link to a form of linear media such as a streaming video but they are able to create this link to a point in time within the streaming video. This makes the link more specific, allowing the user to identify a specific point in time within the streaming video. By clicking on the bookmark the viewer is taken to the specific point that the message poster was referring to rather than them having to launch the video and then seek to the location. However this link is also one way and the message holds no further information about the streaming video.

While the two previous examples show that in a simple sense it is already possible to link the linear media and asynchronous technologies, they are limited in their use given the one-way nature of their link.

It is an object of the present invention to provide a method and system for correlating asynchronous content with linear media which overcomes the disadvantages of the prior art, or to at least provide a useful alternative.

SUMMARY OF THE INVENTION

According to a first aspect of the invention there is provided a method of correlating content to linear media, including the steps of:

i) creating content related to the linear media;
ii) identifying a portion of the linear media correlated to the content; and
iii) linking the content to the portion;

wherein the content is not synchronized with the linear media and the content is created non-contemporaneously with creation of the linear media.

It is preferred that the method includes the step of recording the linear media before step (i).

The portion may be identified in step (ii) by:
playing the linear media
a user electing to link content
the user providing content
wherein the portion identified is the position within the linear media when the user elects to link content and the linear media continuing playing when the user provides content.

The portion may be identified in step (ii) by:
playing the linear media
a user electing to link content
pausing the linear media
the user providing content
wherein the portion identified is the position within the linear media when the user elects to link content.

Preferably the link is a two-way link.
It is preferred that the linear media is any one of:
Streaming Video (e.g. RealMedia, Windows Media, QuickTime video)
Streaming Audio (e.g. RealMedia, Windows Media, QuickTime audio)
Streaming Presentation (Video/Audio and still images e.g. SMIL presentation)
Flash presentations
Director/Authorware presentations
HTTP pseudo-streaming video (e.g. QuickTime fast start movie)
HTTP pseudo-streaming audio
CD/DVD based video
CD/DVD based audio
CD/DVD based synchronized media presentations
Hard disk based video
Hard disk based audio
Hard disk based synchronized media presentations
Image sequences (photo montages etc)
IPTV
Digital Television (i.e. HDTV)
3G video
Audio CD
It is preferred that the content is one or more of:
Textual (e.g. text/character based message posting)
Chat transcript
Speech to text transcript of audio content of linear media.
Streaming audio/Streaming video response (sort of an asynchronous videoconference)
Downloaded audio/video (like leaving a voice/video mail response)

Still image
Link to another instance of the invention
Link to a web site or content on a web site
Any of the linear media described above.

It is preferred that the user who identifies the portion within linear media creates the content. Alternatively, the content may not be created directly by the user who identifies the portion.

The portion may be a specific point in time or a range in time.

The portion may be identified with the assistance of a user.

The portion may be identified with the assistance of a computer based on rules put in place by a user at an earlier time.

The portion may be identified by one of:
A specific point in time by user selection based on viewing/listening to media
A range in time by user selection based on viewing/listening to media
A range in time based on the content currently viewed by the user (e.g. the start and end time of the current slide being viewed in the video).
A specific point in or range in time based on user selection with a margin of error (e.g. ±30 seconds of user selection)
Randomly selected
A specific event (by change of slide, change of media source etc)
the H.323 protocol, including those protocols covered under the H.323 umbrella, is used to identify specific events
A word or phrase (e.g. speech to text recognition)
Video content (e.g. video analysis yields when a particular person appears in the video)
Identified by reference through a link to content already identifying a portion.
Automated selection based on a predefined set of rules (e.g. computer processes media)
By grouping a set of available content and identifying earliest start and latest end time.

It is preferred that the method includes the step of streaming to a user computer, downloading to a user computer, or storing on recordable media for use by a user computer, before step (i).

It is preferred that the linear media is video and the content is text.

The method may include the step of a user replying to the content with a second content. In such a case the method may further include the step of linking the second content to the portion linked to by the content.

The method may include the step of time-stamping the creation of the content.

Preferably, information identifying the portion is stored with the content.

According to another aspect of the invention there is provided a method of correlating content with linear media, including the steps of:
i) a plurality of users each identifying a portion within the linear media;
ii) each user creating content relating to the corresponding portion; and
iii) linking each content to its corresponding portion;
wherein the content is not synchronized with the linear media and the content is created non-contemporaneously with creation of the linear media.

The method may include the step of time-stamping the creation of each content.

Preferably, each link is a two-way link.

According to another aspect of the invention there is provided a method of providing a collaborative media, including the steps of:
i) recording a linear media;
ii) a plurality of users identifying a portion within the linear media;
iii) each user creating content related to the corresponding portion;
iv) linking each content to its corresponding portion;
v) displaying an interface containing the plurality of content to a user;
vi) the user selecting one content; and
vii) the interface displaying the portion of the linear media corresponding to the selected content;
wherein at least one content is not synchronized with the linear media and at least one content is created non-contemporaneously with the creation of the linear media.

The method may include the step of time-stamping the creation of each content.

It is preferred that each link is a two-way link.

Preferably, none of the content is synchronized with the linear media.

Preferably, all of the content is created non-contemporaneously with the creation of the linear media.

According to another aspect of the invention there is provided a method of accessing linear media, including the steps of:
i) a user selecting asynchronous content; and
ii) playing the linear media from a portion linked to the content;
wherein the content has been created non-contemporaneously with creation of the linear media.

According to another aspect of the invention there is provided a method of accessing linear media, including the steps of:
i) a user searching for selecting a range of time;
ii) displaying asynchronous content linked to portions of the linear media within the range of time; and
iii) displaying the linear media in the range of time;
wherein the content has been created non-contemporaneously with creation of the linear media.

According to another aspect of the invention there is provided a method of accessing linear media, including the steps of:
i) displaying the linear media; and
ii) at a temporal location in the linear media, displaying asynchronous content linked to a portion of the linear media related to that temporal location;
wherein the content has been created non-contemporaneously with creation of the linear media.

According to another aspect of the invention there is provided a system for correlating content with linear media, including:
a server arranged for streaming linear media to a client device; and
a client device arranged for receiving the linear media, for accepting user input to identify a portion of the linear media, for creating content, and for linking the content with the portion.

Preferably the server communicates with the client device over the Internet. More preferably, the system includes a plurality of the client devices.

According to another aspect of the invention there is provided a system for providing collaborative media, including:

a first device arranged for displaying linear media, for accepting user input to identify a portion of the linear media, for creating content, and for linking the content with the portion; and a second device arranged for displaying the content, for receiving user input to select the content, and for displaying the portion of the linear media linked to the content.

According to another aspect of the invention there is provided an apparatus for correlating asynchronous content with linear media, including:
  a memory arranged for storing the linear media and for storing the content;
  an output device arranged for outputting the linear media to a user;
  an input device arranged for receiving user input to assist identification of a portion of the linear media; and
  a processor arranged for linking a portion of the linear media to the content.

Preferably the input device is further arranged for receiving user input to create the content.

According to another aspect of the invention there is provided a server for correlating asynchronous content with linear media arranged for receiving content, receiving identification of a portion of the linear media, and linking the content to the linear media; wherein the content is created non-contemporaneously with the creation of the linear media.

According to another aspect of the invention there is provided a client for correlating asynchronous content with linear media arranged for creating the content, receiving user input to assist the identification of a portion of the linear media, sending the content and the identification to a server; wherein the content is created non-contemporaneously with the creation of the linear media.

According to another aspect of the invention there is provided software for correlating asynchronous content with linear media, including:
  a user interface arranged for displaying the linear media, receiving user input to identify a portion of the linear media, and receiving user input to assist the creation of content; and
  a collaboration module arranged for linking the content to the portion of the linear media; wherein the content is created non-contemporaneously with the linear media.

According to another aspect of the invention there is provided signals transmitted between the server and the client in any system of the invention.

According to another aspect of the invention there is provided a collaborative media resulting from any of the methods, systems: software, apparatus, servers, or clients of the invention.

According to another aspect of the invention there is provided a collaborative media, including:
  linear media;
  content; and
  timing information linking the content to a portion of the linear media.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention describes a method and system for correlating asynchronous content with linear media by linking the content with a portion of the linear media.

Figure 1:
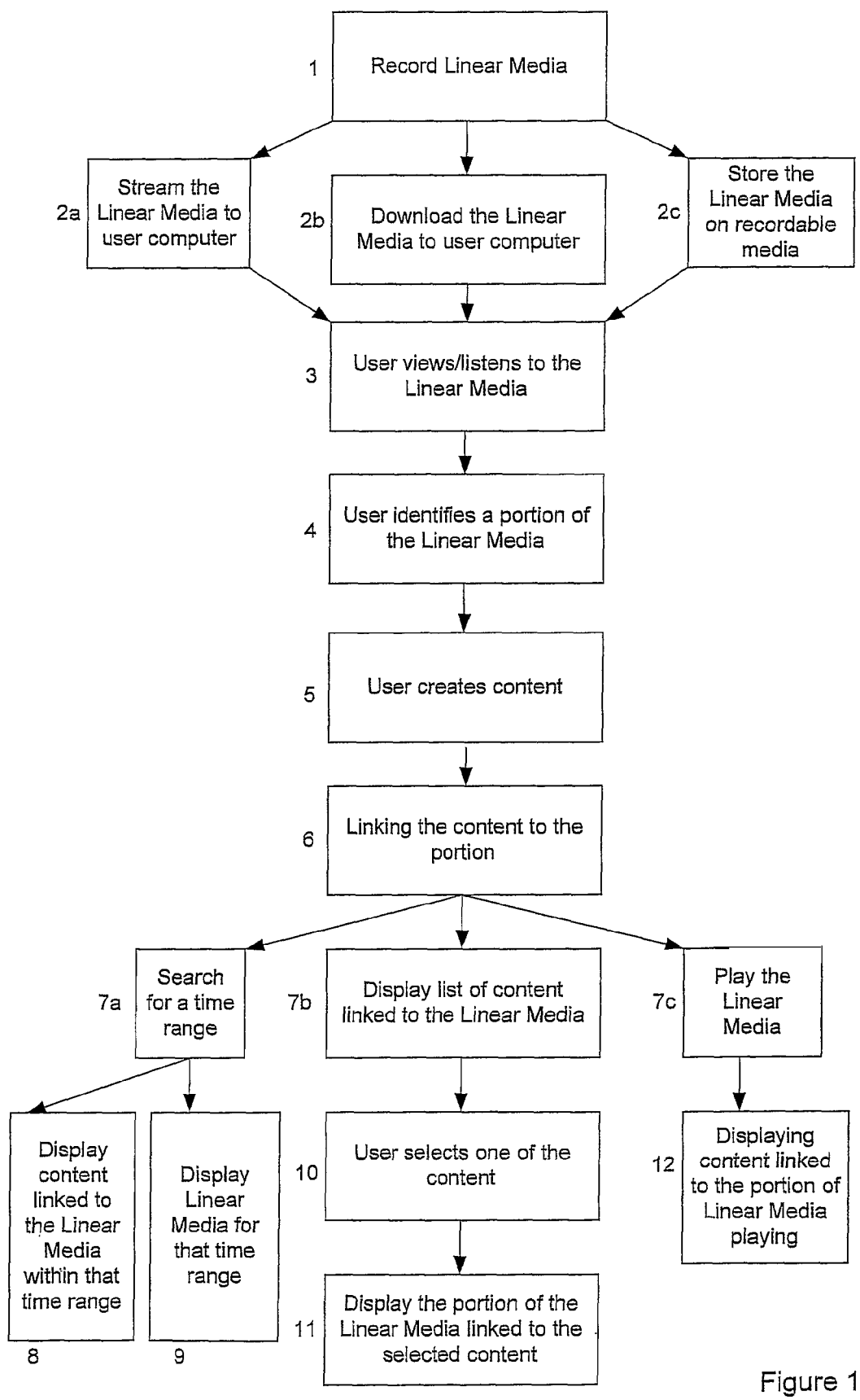
FIG. 1: shows a flow diagram illustrating a method of the invention.

A method of the invention will now be described with reference to FIG. 1.

In step 1 linear media is recorded. Linear media is any media with a defined start time and, preferably, a defined stop time.

The following media types are examples of some of the types of linear media that can be used in this invention:
  Streaming Video (e.g. RealMedia, Windows Media, QuickTime video)
  Streaming Audio (e.g. RealMedia, Windows Media, QuickTime audio)
  Streaming Presentation (Video/Audio and still images e.g. SMIL presentation)
  Flash presentations
  Director/Authorware presentations
  HTTP pseudo-streaming video (e.g. QuickTime fast start movie)
  HTTP pseudo-streaming audio
  CD/DVD based video
  CD/DVD based audio
  CD/DVD based synchronized media presentations
  Hard disk based video
  Hard disk based audio
  Hard disk based synchronized media presentations
  Image sequences (photo montages etc)
  IPTV
  Digital Television (i.e. HDTV)
  3G video
  Audio CD Examples of the data which could be recorded for some of the above media types are:
  Live Video
    Studio based
    Home recorded
    Video Conference
    Web-cam
    Screen capture
  Live audio
    Spoken word
    Music
    Sound effects
    Sounds of nature Animation (video)
    Cell frame animation
    Simulations
    Stop-motion
Computer Generated Animation (video)
    User interfaces
    Computer based simulations
    Multiple possible outcome environments (e.g. games)
Computer generated audio
Timed slide shows
    Presentations
    Photos
    Tests
Looped video
Looped audio
Looped slide shows In step 2a, the linear media is streamed to a user computer. Alternatively, the linear media may be downloaded to the user computer, as in step 2b, or may be stored on recordable media for use by the user computer, as in step 2c.

In step 3, the user views/listens to the linear media on the user computer.

In step 4, a portion of the linear media is identified.

Portions can be defined and identified by either the user viewing/listening to the linear media directly, or by mechanical means based on rules put in place by the user at an earlier time.

The portion may be a range of time or it may be a specific point in time in the linear media.

The portion can be identified in any of the following ways:
    A specific point in time by user selection based on viewing/listening to media
    A range in time by user selection based on viewing/listening to media
    A range in time based on the content currently viewed by the user (e.g. the start and end time of the current slide being viewed in the video).
    A specific point in or range in time based on user selection with a margin of error (e.g. +/−30 seconds of user selection)
    Randomly selected
    A specific event (by change of slide, change of media source etc)
    A word or phrase (e.g. speech to text recognition)
    Video content (e.g. video analysis yields when a particular person appears in the video)
    Identified by reference through a link to content already identifying a portion.
    Automated selection based on a predefined set of rules (e.g. computer processes media)
    By grouping a set of available content and identifying earliest start and latest end time.

Identification of the portion by a specific event can be implemented with the assistance of the H.323 protocol and those protocols covered under the H.323 umbrella such as H.245, H.225.0, and H.263 G.711.

H.323 is the International Telecommunications Union Recommendation for packet-based multimedia communications systems. The recommendation applies to entities that provide multimedia communications over packet based networks which do not necessarily provide a guaranteed Quality of Service (QoS). It specifies the form of media communication H.323 entities may provide and how they communicate.

Such information can include indexes identifying specific events within the videoconference such as a change to a document camera, reception of a snapshot (still image), switching to a different site in a multipoint call and identifying the times in which a particular site was active during the videoconference. These indexes, once captured can then form the basis for identifying the portion in time for the linking of the asynchronous content and the linear media by selection of a specific event within the videoconference.

In step 5, the user creates content. This occurs non-contemporaneously with the creation of the linear media. For example, if the linear media is a teleconference, the content could be a discussion about a portion of the teleconference created after reviewing the recorded teleconference. Step 5 can occur before step 4.

The following are examples of types of content that could be used:
    Textual (e.g. text/character based message posting)
    Chat transcript
    Speech to text transcript of audio content of linear media.
    Streaming audio/Streaming video response (sort of an asynchronous videoconference)
    Downloaded audio/video (like leaving a voice/video mail response)
    Still image
    Link to another instance of the invention
    Link to a web site or content on a web site
    Includes most of the linear media types listed above In step 6, the content is linked to the identified portion of linear media.

There are a number of ways in which this linked content and linear media may now be accessed by a user:
a) In step 7a, the user searches for a specific time range within the linear media. The content linked to the linear media within that time range is displayed 8 and the linear media for that time range is played 9;
b) In step 7b, a list of all content linked to the linear media is presented to the user. The user selects one of the displayed content 10. The portion of the linear media which is linked to the content is played 11; or
c) In step 7c, the linear media is played and the content linked to the portion of linear media playing is displayed 12.

The content (such as a message) holds information relating to timing information about the linear media that it links to, and it also maintains timing information about when it was created and when it was edited (if the content has been edited). The content creation time allows for the chronological ordering of the content so that when presented to the user in step 7b the list of content can follow the natural time order of the content postings.

When the content creation time is used in conjunction with the linked portions of time in the linear media the user can follow a chronological history of the content postings as related to the portions of interest in the linear media.

Content (such as messages) can also be displayed to the user in a threaded mode whereby the content is organised chronologically but allows for replies to message to create a new chronologically ordered message thread.

Figure 2:
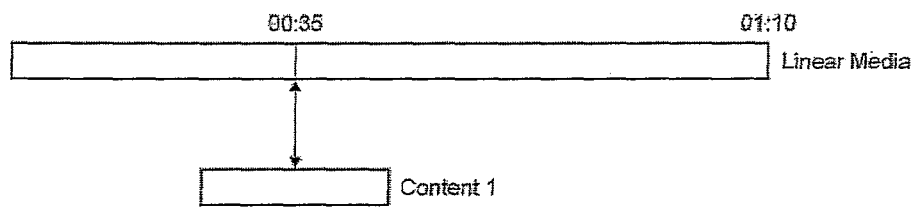
FIG. 2: shows a diagram illustrating how content may be linked to a portion denoting a specific point in time of the linear media.

FIG. 2 describes a single instance of asynchronous content identifying a point in time within the linear media stream. This point in time is referenced not by a "bookmark" type link within the content but by reference through a separate element of the content instance. This reference element allows the content as a whole to link to the linear media stream rather than just a small subset of the content as in the "bookmark" type link. This is a two way link—while the content references a specific point in time within the linear media stream, the media stream itself can be used to find that particular content instance.

Figure 3:
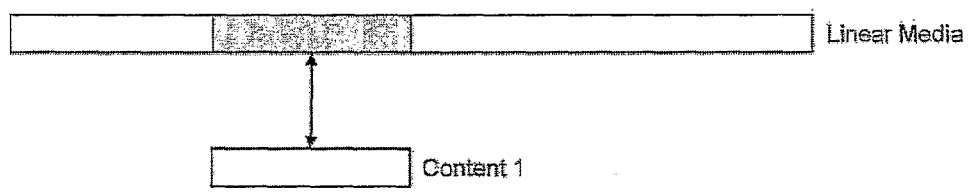
FIG. 3: shows a diagram illustrating how content may be linked to a portion denoting a range in time of the linear media.

FIG. 3 describes a single instance of asynchronous content identifying a range in time within the linear media stream.

This range in time can be referenced by one or more reference elements within the content instance. Reference element examples are: start time, start time and duration, start time and end time etc. This is a two way link—while the content references a range in time within the linear media stream, the media stream itself can be used to find that particular content instance based on the range in time.

Figure 4:
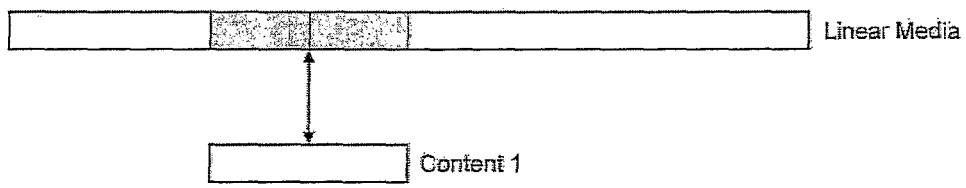
FIG. 4: shows a diagram illustrating how content may be linked to both a range in time portion and a specific point in time portion of the linear media.

FIG. 4 describes a single instance of asynchronous content identifying both a point in time and a range in time. It uses the methods described in FIGS. 2 and 3 to deal with the identification and linking of points in time and ranges in time. This example offers full two-way linking with both the point in time and range in time offered.

Figure 5:
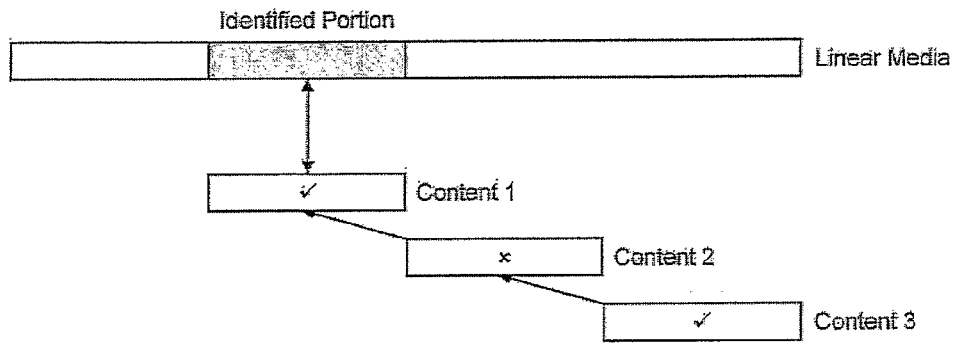
FIG. 5: shows a diagram illustrating how multiple content may be linked to a single portion of the linear media.

FIG. 5 shows Content 1 being asynchronous content linked to the Linear Media stream by a range in time (and vice versa). Content 2 is a reply to Content 1 but the context of Content 2 in reference to Content I is outside of the intent of content 1 and the Linear Media. This means that Content 2 is not directly related to the linear media stream. Content 3 is a reply to Content 2 but is within context of the Linear Media. Content 3 can be referenced through Content 2 (as the reference times are kept but marked as "inactive") to Content 1 and therefore the linear media portion. Viewing the related content from the identified portion in the linear media would not yield Content 2 as a result as it would be deemed not specifically related.

Figure 6:
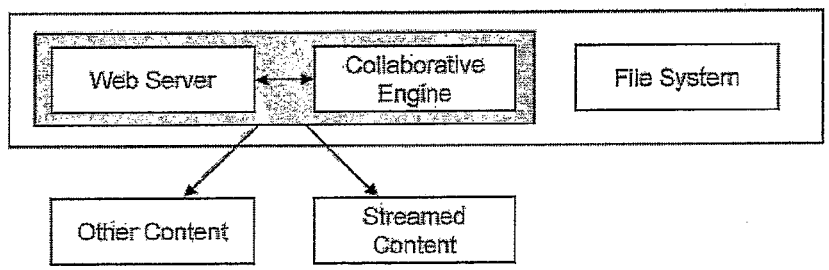
FIG. 6: shows a diagram illustrating how a method of the invention may be embodied in software.

FIG. 6 shows how the invention could be deployed across software modules. A Web Server and Collaboration Engine are housed within one common interface, this then links to the file system for media and content access. The content hosted in this system is then linked to other systems external to the core facilities of Web Server, Collaborative Engine and the File System.

The combination of the Web Server and Collaboration Engine can take two forms, the first being the Collaboration Engine in the form of a CGI application interacting with the Web Server. In this case the Web Server acts as an intermediary between the user and the Collaboration Engine by handling the communication requests and passing these requests on to the Collaboration Engine for processing. The Collaboration Engine then passes the results of the request back to the Web Server for presentation to the user.

The second form is where the Web Server and Collaboration Engine are one entity. This form has the advantage of speed of processing as the requests are received from the user via the Web Server, processed by the Collaboration Engine and the results sent back to the user via the Web Server all within the same application, thus eliminating the bottleneck of the pipe between the Web Server and Collaboration Engine in the first form.

In both cases the technology behind the linking of the asynchronous content and linear media makes use of both server side (within the Collaboration engine) and client side (with the users Web Browser) scripting technologies. The server side scripting runs within the Collaboration Engine on the server and the user sees only the results of these scripts. The client side scripts however are generated by the Collaboration Engine and are sent in their entirety as part of the results from the Collaboration Engine and are executed on the users' computer through their web browser.

Figure 7:
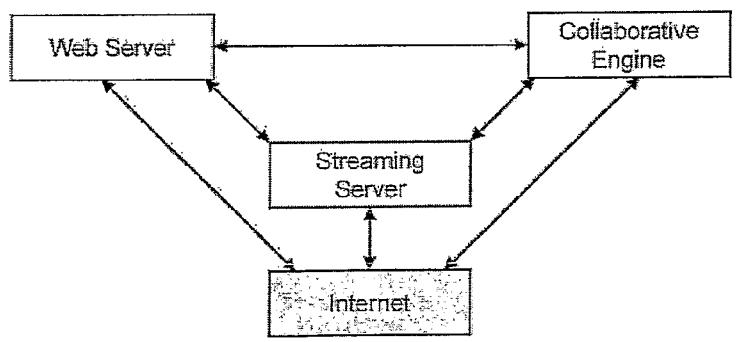
FIG. 7: shows a diagram illustrating how the invention may be deployed on hardware.

FIG. 7 shows a sample distributed deployment where the invention is hosted across different hardware. Each of the technologies communicates with the others and interacts with the user via the Internet. This figure shows that the invention is not limited to deployment on a single machine. It will be appreciated that the hardware can be of differing type, in differing locations and running different operating systems.

The invention may also be deployed in any of the following ways:
   Simple deployment as software running on hardware such as a PC. Operates as a web server hosting the collaborative engine and file system for hosted content. Provides links to other content types on other servers (such as streamed media on external streaming server).
   Embedded system where deployed as a turn-key hardware solution. Contains the collaboration engine, web server, streaming server, and content acquisition tool (such as H.323 videoconference recorder).
   Software Plug-in to a third party collaboration engine (e.g. Moodle)

An example of how the invention could be used for an asynchronous videoconference will be described:

This deployment would use the standard structure of the asynchronous collaborative engine but all messages would be posted as a video and/or audio message (streamed or downloaded). Standard multipoint videoconference options as continuous presence can be mimicked by mixing video images and audio from multiple messages together on a predefined set of rules. Messages posted as replies use the same method of linking back to the original message—this allows the end user to follow a specific video/audio path through the entire collaboration following a specific thread as one complete video/audio program.

Figure 8:
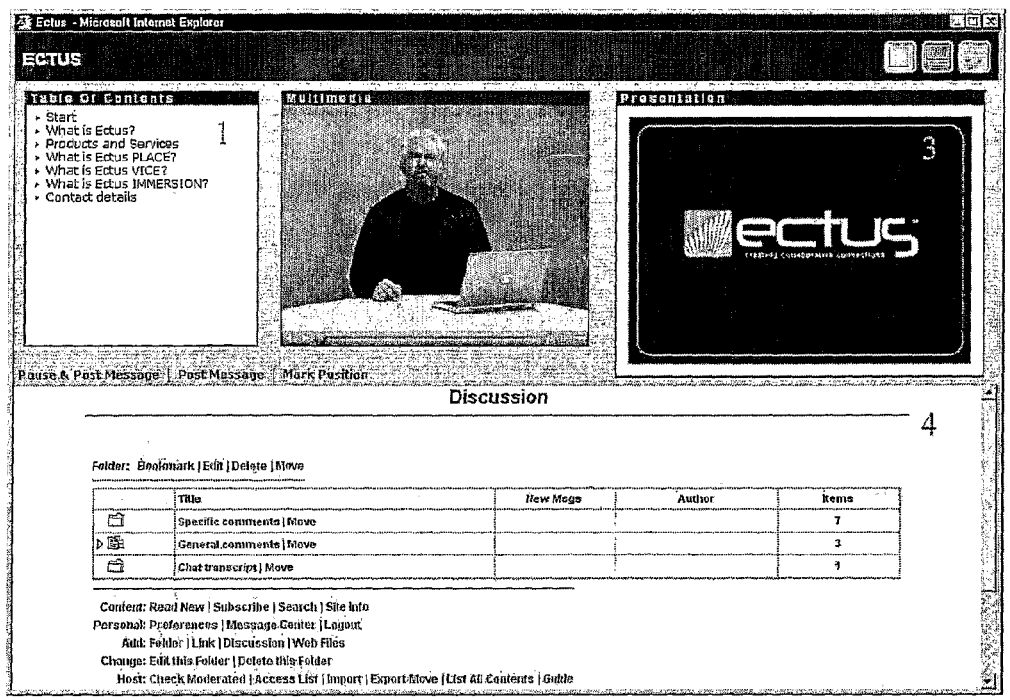
FIG. 8: shows a screenshot illustrating the invention in operation.

Referring to FIG. 8, a software implementation of the invention will be described.

The graphical user interface (GUI) provides four individual panes of information:
   1. Table of Contents or Index pane. This contains links to specific events or points within the media content.
   2. Multimedia pane. The specific media element itself.
   3. Presentation pane. Any slides, presentation images or dual stream video available during the conference.
   4. Asynchronous Collaboration pane. Where all of the asynchronous collaboration and interaction takes place.

The collaboration area is broken down into a hierarchy of Folders and Discussions. Discussions are always contained within folders and folders may contain other folders. The linking technology is implemented as a different form of folder with modifications made to the discussions and message types.

A linking technology folder maintains information about the media elements that it is linking and the layout (theme/template) that is used to display both elements. The name of the specific linking technology folder is provided by the user when setting up the folder item. Also provided at this time is the access list for the folder detailing which users have access to its content and what sort of access (such as no-access, read-only, read-write, moderated). The folder item also contains the necessary information about the media element (such as location, duration, media type, supported bitrates).

One sub-folder is automatically created on completion of a videoconference:
   Specific Comments—containing individual discussions for each of the indexed elements (as shown in Pane 1)

When the media is playing, the user has the opportunity at any time to post a message. This message may either be related to a specific point in time within the media, a range of time within the media or to. not a specific time but the media as a whole. When posting this message the user has the ability to "pause and post" the message or to "Post" the message and have the media continue.
   "pause and post" stops the media from playing and takes the user to the "Post Message" form to compose their message. Two sets of timings are taking from the video at this time that relate to the specific point in time where the "pause and post" message was activated, and the range in time for the indexed element that the current time is contained within (i.e. range for beginning to end of slide). This range in time can also be computed by other methods such as storing the index number or name and referring to the timestamp from there along with the timestamp for the next event.

"post" message takes the same timing information from the media as the "pause and post" method but continues to play the media while the user completes the message posting.

The timing information for the specific point and range in time are stored as attributes of the discussion node so can be retrieved at any time by the system. The media that the discussion relates to is not stored specifically with the discussion node element but is derived by working up the folder/discussion hierarchy to the top level folder for this folder item.

When posting the message, once the user has completed typing in their message they have the option of posting the message directly within the specific comments about the event that is covered by the range in time where they posted or to post in the general comment discussion. In either case the timing information of where the message was posted within the media is contained, although in the case of the "general comments" posting the timing information is marked as "inactive". The inactive marking stops this comment from being returned in a time specific search but by retaining the timing information the message can be relinked with the media at a later time (by marking as "active").

With the timing information stored within a discussion message this now offers the ability for the user to click on a link within the discussion to go directly to the point in the video at which the message was posted or to the beginning of the range in which the message was posted. Moving to specific points in the video is further enhanced by offering the ability to easily go to the specific point + or − time increments (e.g. +/−30 sec and +/−1 min).

The reverse is also available with the user finding a point in the media and then accessing the discussion linked with that point. This again can be done on a specific point or range in time basis. If it done on a specific point in time then that point can be setup to show discussions from this point on or again +/− a time increment.

While users can use either the media or discussions themselves as their initial contact with this system, a search can also be carried out which will return links to the media on a similar basis to the direct links within the discussions.

Examples of how the invention could be used will now be described:

Scenario 1—Education

A Teacher engages in teaching activity in a normal fashion, except for the teaching content being captured in a linear fashion in the following media: Video, Audio, Slide presentation. This media is then presented to the learners in an on-demand situation. They are able to avail themselves of the streamed video and audio material as one or more streams-being the slide material that is linked chronologically to the streamed video and audio. Learner one views the linear media and at the point slide three appears he has a question that is related to that portion of the linear media. He clicks on the Post Message at this Point button and enters his question. As soon as Learner one posts the message, other members of the learning community can be informed by the notification system. Learner two chooses to be notified via email, she then views the message posted by learner one, and posts a reply that reiterates the question. The teacher then responds to her notification of the messages, views the messages and chooses to view the linear media portion referenced by learner one. After reviewing the video, audio and slide presented, the teacher then responds to learner one and two with an answer to their questions.

Scenario 2—Health

A Professor of medicine presents Grand Rounds to a group of teaching hospitals connected via video conferencing equipment. At various points during the presentation the camera is switched to close up views of the neurosurgical procedure being discussed. During the live presentation of the Grand Rounds a medical student posts a message asking for clarification of the procedure involving testing for neurological function using an electrode probe. After the Grand Rounds is completed, another professor of neurology at one of the teaching hospitals responds to the post with a clarification on this procedure. Three months later a neurosurgeon practicing in a remote rural hospital reviews the presentation in preparation for an operation she is about to perform. She reviews the discussion before looking at the linear media, and while doing so discovers using the search engine the discussion of the probing procedure initiated by the student. After reviewing the discussion she then used the link back to the relevant portion of the linear media to view that part of the presentation relevant to her patient.

Scenario 3—Commerce

A sales presentation for Product X is recorded and then made available using the invention. This presentation is then made available to all potential buyers of Product X. Each potential buyer is able to make comments about elements of the product presentation which can be directly referred back to by the sales staff. If the comment is positive, the sales staff can revise the presentation to include more of that material, if it is negative the presentation can be revised accordingly. In addition, sales and development staff are able to address specific questions and concerns directly to the potential buyers. The marketing staff can then analyze the links made to the linear media and use the information to help devise sales and marketing material targeted directly to the purchasers.

While the traditional forms of linking allow parts of the asynchronous side to know limited information about the media, the two-way link of the present invention provides that advantage of permitting the media to know about the asynchronous technology and allowing the asynchronous technology to know more detailed information about the media. This now makes it possible for a user to watch a form of linear media, such as a streamed video, and at any point view the asynchronous collaboration that has taken place at that point or around that time. The viewer can access all asynchronous collaboration that took place around that point in the media or only pieces of the asynchronous collaboration that specifically relate to that point in time. This technology is not limited to only points in time, it is also valuable in linking a range in time within the media to the asynchronous collaboration that took place within that range in time.

Advancing on the traditional forms of linking the present invention introduces the ability for a user to view the relevant portion of the media based on a specific message or a group (e.g. discussion thread) of messages without any of these messages requiring specific links within the content into the media.

The present invention accomplishes this through the addition of specific timing information that is added to the message, discussion or folder during the posting of the content in the asynchronous technology. This timing information holds information such as (but not limited to) the specific point in time within the media the content relates to, the beginning of the range in time the content relates to and the end of the range in time which the content relates to. The invention also alters the way in which content is posted to the asynchronous collaboration technology by providing the ability to link the content to the media.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of correlating content to linear media, comprising:
   i) creating content related to the linear media;
   ii) identifying a portion of the linear media correlated to the content;
   iii) linking the content to the portion, wherein a link between the content and the portion is a two-way link and said linking uses timing information; and
   iv) marking the link as inactive, which prevents the content from being returned in a search,
   wherein the content is not synchronized with the linear media, and the content is created non-contemporaneously with creation of the linear media.

2. A method as claimed in claim 1 further comprising recording the linear media before the creating (i).

3. A method as claimed in claim 2, wherein the user provides the content after the user elects to link the content and wherein the playing of the linear media is paused when the user provides the content.

4. A method as claimed 1, wherein the portion is identified in the identifying (ii) by:
   playing the linear media; and
   a user electing to link the content;
   wherein the portion identified is the position within the linear media when the user elects to link content.

5. A method as claimed in claim 4, wherein the user provides the content after the user elects to link the content and wherein the linear media continues playing when the user provides the content.

6. A method as claimed in claim 1, wherein the linear media is one or more selected from the set of streaming video, streaming audio, streaming presentation, Flash presentations, Director/Authorware presentations, HTTP pseudo-streaming video, HTTP pseudo-streaming audio, CD/DVD based video, CD/DVD based audio, CD/DVD based synchronized media presentations, hard disk based video, hard disk based audio, hard disk based synchronized media presentations, image sequences, IPTV, digital television, 3G video, and audio CD.

7. A method as claimed in claim 1, wherein the content is one or more selected from the set of textual, chat transcript, speech to text transcript of audio content of linear media, streaming audio/streaming video response, downloaded audio/video, still image, link to another instance of the invention, link to a web site or content on a web site, streaming video, streaming audio, streaming presentation, Flash presentations, Director/Authorware presentations, HTTP pseudo-streaming video, HTTP pseudo-streaming audio, CD/DVD based video, CD/DVD based audio, CD/DVD based synchronized media presentations, hard disk based video, hard disk based audio, hard disk based synchronized media presentations, image sequences, IPTV, digital television, 3G video, and audio CD.

8. A method as claimed in claim 1, wherein a user identifies the portion within the linear media and creates the content.

9. A method as claimed in claim 1, wherein a user identifies the portion within the linear media but does not create the content.

10. A method as claimed in claim 1, wherein the portion is a specific point in time.

11. A method as claimed in claim 1, wherein the portion is a range in time.

12. A method as claimed in claim 1, wherein the portion is identified with assistance of a user.

13. A method as claimed in claim 1, wherein the portion is identified with assistance of a computer based on rules put in place by a user at an earlier time.

14. A method as claimed in claim 1, wherein the portion is identified in the identifying (ii) by one or more of:
   a) a user selecting a specific point in time for the portion based on viewing/listening to the linear media;
   b) a user selecting a range in time for the portion based on viewing/listening to the linear media;
   c) identifying the portion based on the range in time of linear media viewed by a user;
   d) identifying the portion based on a random selection;
   e) identifying the portion based on a specific event within the linear media;
   f) identifying the portion based on the location of a word or phrase within the linear media;
   g) identifying the portion based on analysis of video content of linear media;
   h) identifying the portion by reference through a link to content already identifying a portion;
   i) identifying the portion based on a predefined set of rules; and
   j) identifying the portion based on a set of content wherein each content within the set is linked to a portion of the linear media, the identified portion being the range of time within the linear media from the earliest link in the set of content to the latest link in the set of content.

15. A method as claimed in claim 14, wherein the portion is identified based on a specific event within the linear media, wherein the H.323, SIP, H.234, or H.234/M protocol, or protocols covered under the H.323 umbrella, is used to identify the specific event.

16. A method as claimed in claim 1, wherein the portion is identified based on user selection with a margin of error.

17. A method as claimed in claim 1, further comprising at least one of streaming to a user computer, downloading to a user computer, and storing on recordable media for use by a user computer, before the creating i).

18. A method as claimed in claim 1, wherein the linear media is video and the content is text.

19. A method as claimed in claim 1, further comprising a user replying to the content with a second content.

20. A method as claimed in claim 19, wherein the second content is linked to the portion linked to by the content.

21. A method as claimed in claim 19, wherein the second content is not linked to the portion linked to by the content.

22. A method as claimed in claim 1, further comprising time-stamping the creation of the content.

23. A method as claimed in claim 1, wherein information identifying the portion is stored with the content.

24. A method as claimed in claim 1, further of comprising:
   selecting one content; and displaying the portion of the linear media corresponding to the selected content.

25. A method as claimed in claim 24, further comprising time-stamping the creation of each content.

26. A non-transitory computer readable storage medium encoded with instructions, which when executed by a computer causes the computer to execute a method of correlating content to linear media, comprising:
   i) creating content related to the linear media;
   ii) identifying a portion of the linear media correlated to the content;
   iii) linking the content to the portion, wherein a link between the content and the portion is a two-way link and said linking uses timing information; and
   iv) marking the link as inactive, which prevents the content from being returned in a search,
   wherein the content is not synchronized with the linear media, and the content is created non-contemporaneously with creation of the linear media.

27. An apparatus comprising:
   a memory that stores computer executable instructions; and
   a processor configured to execute the instructions in order to
      create content related to linear media,
      identify a portion of the linear media correlated to the content;
      link the content to the portion, wherein the link between the content and the portion is a two-way link and said link uses timing information, and
      mark the link as inactive, which prevents the content from being returned in a search,
   wherein the content is not synchronized with the linear media, and the content is created non-contemporaneously with creation of the linear media.

* * * * *